United States Patent
Sigg et al.

(10) Patent No.: US 7,503,278 B2
(45) Date of Patent: Mar. 17, 2009

(54) UNIVERSAL ACTUATOR PARTICULARLY FOR DASHBOARDS

(75) Inventors: Daniel Sigg, Sonceboz (CH); Corinne Zuppiger-Lachat, Bienne (CH)

(73) Assignee: Sonceboz SA, Sonceboz (CH)

( * ) Notice: Subject to any disclaimer, the term of this patent is extended or adjusted under 35 U.S.C. 154(b) by 16 days.

(21) Appl. No.: 10/569,084

(22) PCT Filed: Aug. 27, 2004

(86) PCT No.: PCT/IB2004/002958

§ 371 (c)(1),
(2), (4) Date: Sep. 13, 2006

(87) PCT Pub. No.: WO2005/022088

PCT Pub. Date: Mar. 10, 2005

(65) Prior Publication Data

US 2007/0189025 A1    Aug. 16, 2007

(30) Foreign Application Priority Data

Aug. 29, 2003 (FR) .................................. 03 50479

(51) Int. Cl.
*G01B 13/04* (2006.01)
(52) U.S. Cl. ..................... 116/284; 116/62.1
(58) Field of Classification Search .............. 116/62.1, 116/62.4, 284, 288, 289, 291, 305
See application file for complete search history.

(56) References Cited

U.S. PATENT DOCUMENTS

| 5,603,283 | A | 2/1997 | Owen | |
|---|---|---|---|---|
| 6,302,552 | B1 * | 10/2001 | Ross et al. | 362/30 |
| 6,520,109 | B2 * | 2/2003 | Komura | 116/288 |
| 6,557,485 | B1 | 5/2003 | Sauter et al. | |
| 6,994,053 | B2 * | 2/2006 | Abe et al. | 116/284 |
| 7,023,123 | B2 * | 4/2006 | Suzuki et al. | 310/261 |
| 2002/0001185 | A1 * | 1/2002 | Wilhelm et al. | 362/30 |
| 2004/0012273 | A1 * | 1/2004 | Suzuki et al. | 310/67 R |
| 2007/0039541 | A1 * | 2/2007 | Vuilliomenet et al. | 116/288 |

FOREIGN PATENT DOCUMENTS

| DE | 36 26 957 | | 2/1988 |
|---|---|---|---|
| EP | 0 536 485 | | 4/1993 |
| EP | 0 679 871 | | 11/1995 |
| EP | 1519159 | A1 * | 3/2005 |
| JP | 08 136 292 | | 5/1996 |
| JP | 2000136921 | A * | 5/2000 |
| JP | 2001317970 | A * | 11/2001 |
| JP | 2003194597 | A * | 7/2003 |
| WO | WO 2007138437 | A2 * | 12/2007 |

* cited by examiner

*Primary Examiner*—R. Alexander Smith
(74) *Attorney, Agent, or Firm*—Oblon, Spivak, McClelland, Maier & Neustadt, P.C.

(57) ABSTRACT

An electric dashboard actuator including an electric motor driving an indicator. The electric motor includes a hollow output shaft of which the ends are located at and flush with two opposite surfaces of the motor, and the indicator includes a male coupling member with a cross-section matching the cross-section of the hollow motor output shaft. One motor surface includes a male or female coupling perpendicular to the surface.

9 Claims, 5 Drawing Sheets

- Prior Art -

- Prior Art -

UNIVERSAL ACTUATOR PARTICULARLY FOR DASHBOARDS

The present invention relates to the art of analog instrumentation intended for dashboards, and more particularly to electrical actuators intended to position the indicators of dashboards. These actuators are soldered onto printed circuits, which are provided on their upper face with the set of electronic components, and especially the light-emitting diodes used to illuminate the indicators.

Depending on the application, the actuators can be mounted on the upper or lower face of the printed circuit. These two mounting alternatives correspond to two types of actuators:

In the first version, the actuator is mounted on the upper face or component side of the printed circuit. The indicator is fixed on the upper side of the motor, known as front mounting.

In the second version, the actuator is mounted on the lower face or unoccupied side of the printed circuit. The indicator is fixed through the printed circuit on the lower side of the motor, known as rear mounting.

The object of the invention is to provide a single version of a universal motor, without output spindle, wherein the application can be connected to the printed circuit on either one of its two faces, while permitting an indicator to be installed.

The motor without output spindle has a "female"-type connection open on both sides of the actuator, suitable for receiving the output spindle of the indicator. This indicator can therefore be provided with, for example, a pointer and an output spindle or a male-type connection coupling with the female connection equally well on either side thereof.

An embodiment of this type is found in the prior art, for example in EP 0679871. In that patent, however, the motor spindles are hollow and generally extend beyond the upper face of the motor, preventing reversibility of the motor, which is capable of receiving the indicator on one side only.

SUMMARY OF THE INVENTION

The object of the invention is to provide an actuator without spindle and a specific pointer possessing a spindle, to be coupled with the female-type connection in the motor, on either side thereof, without necessitating two types of motor.

In its most general form, the invention relates to a electrical dashboard actuator composed of an electric motor driving an indicator, wherein the electric motor has a hollow output shaft, open on two opposite faces of the motor, and in that the said indicator has a male coupling member having a cross section complementary to the internal cross section of the said hollow output shaft of the motor, one of the faces of the motor having male-type or female-type connecting means perpendicular to the said face.

Advantageously it is provided with a box, in the interior of which the electric motor is housed, the said box having on two opposite faces an opening coaxial with the output shaft of the motor and openings for passage of the said connectors.

According to one alternative embodiment, the male part of the indicator is capable of guiding light to the pointer.

The invention also relates to a dashboard module provided with at least one actuator and a printed circuit, wherein the electrical dashboard actuator is composed of an electric motor driving an indicator by means of a hollow output shaft, open on two opposite faces of the motor, the indicator having a male coupling member having a cross section complementary to the internal cross section of the said hollow output shaft of the motor, one of the faces of the motor having male-type or female-type connecting means perpendicular to the said face.

According to a particular embodiment, the printed circuit has an opening for each actuator for passage of the coupling member of the indicator.

BRIEF DESCRIPTION OF THE DRAWINGS

The invention will be better understood by reading the description hereinafter, making reference to the attached drawings, wherein.

DESCRIPTION OF THE PREFERRED EMBODIMENT

Figure 1:
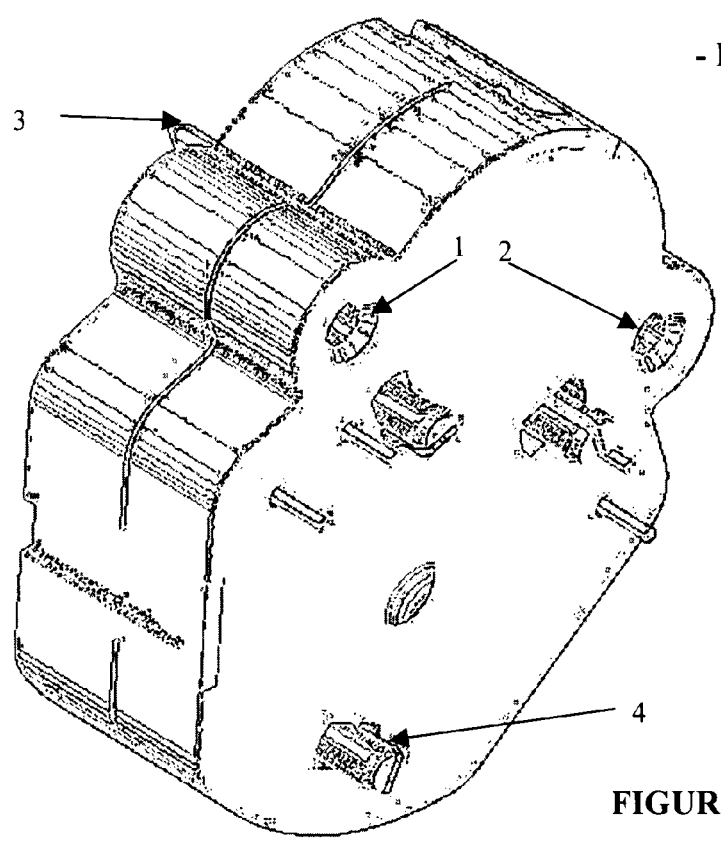
FIG. 1 represents a three-quarters view of the rear face of a front-mounted prior art motor.
Figure 2:
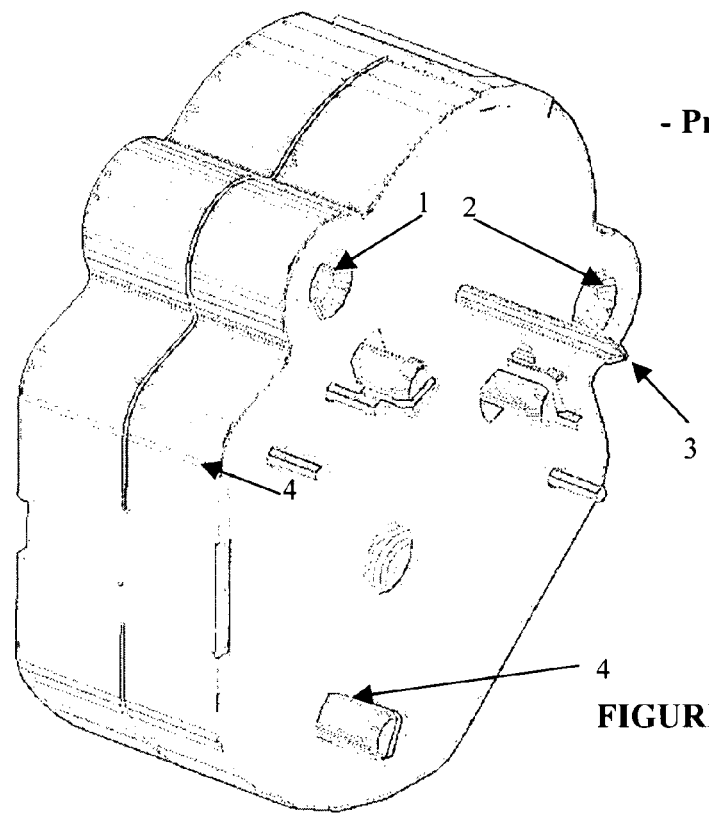
FIG. 2 represents a three-quarters view of the rear face of a rear-mounted prior art motor.

FIGS. 1 and 2 show motorized boxes (1) and (2) of the prior art in two different versions.

In FIG. 1, the first version has an output spindle (3) on the front of motor (1), an opposite mounting surface (4) on a printed circuit supporting all of the electronic components necessary for operation of the motor. This configuration is known as front mounting.

In FIG. 2, second motor version (2) has an output spindle (3) on the side of mounting surface (4), opposite the upper surface of motor (2). This configuration is known as rear mounting.

These two versions make it necessary to construct two distinct types of motor.

Figure 3:
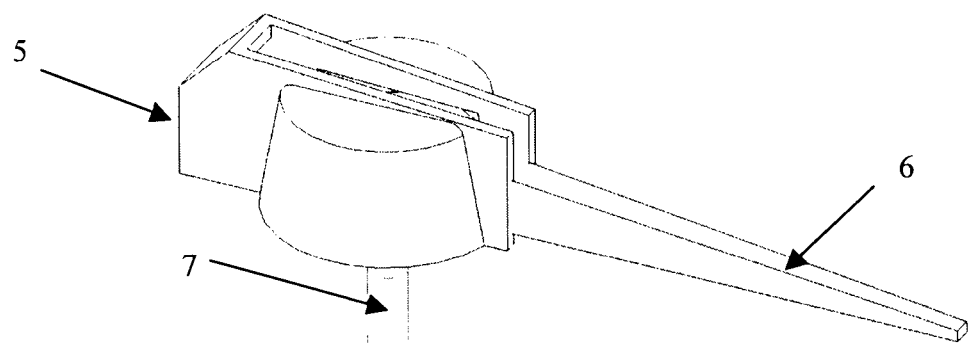
FIG. 3 represents a dashboard indicator of the present invention.

FIG. 3 shows an illuminated dashboard indicator (5) integrated with the motorized box of the invention. Illuminated indicator (5) is composed of a pointer (6) and a spindle (7) in the form of a hollow or solid male-type connection, intended to be coupled with the female-type connection of the motorized box of the invention. Rotary spindle (7) is designed in such a way that it can receive light through it or below the indicator, and thus it will preferably be translucent, transparent or hollow.

Figure 4:
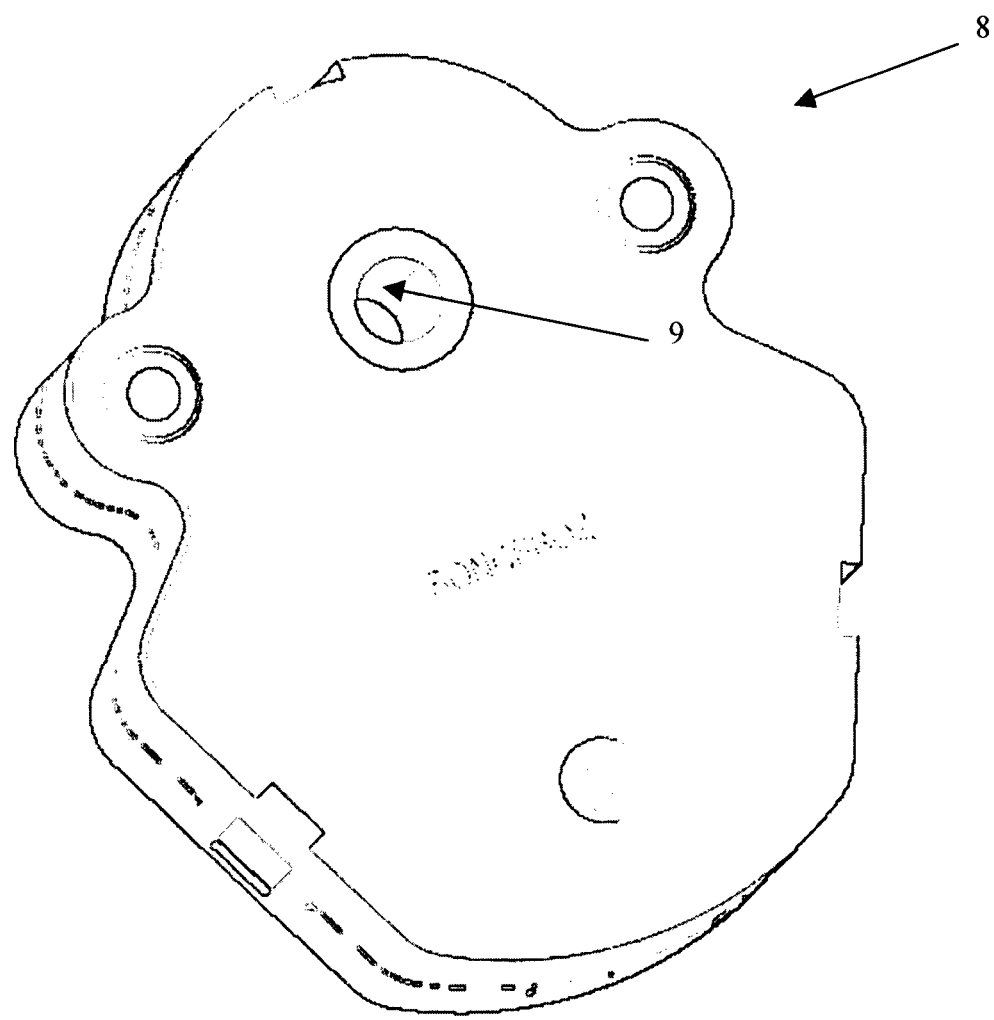
FIG. 4 represents a three-quarters view of the front face of the motorized box of the invention.
Figure 5:
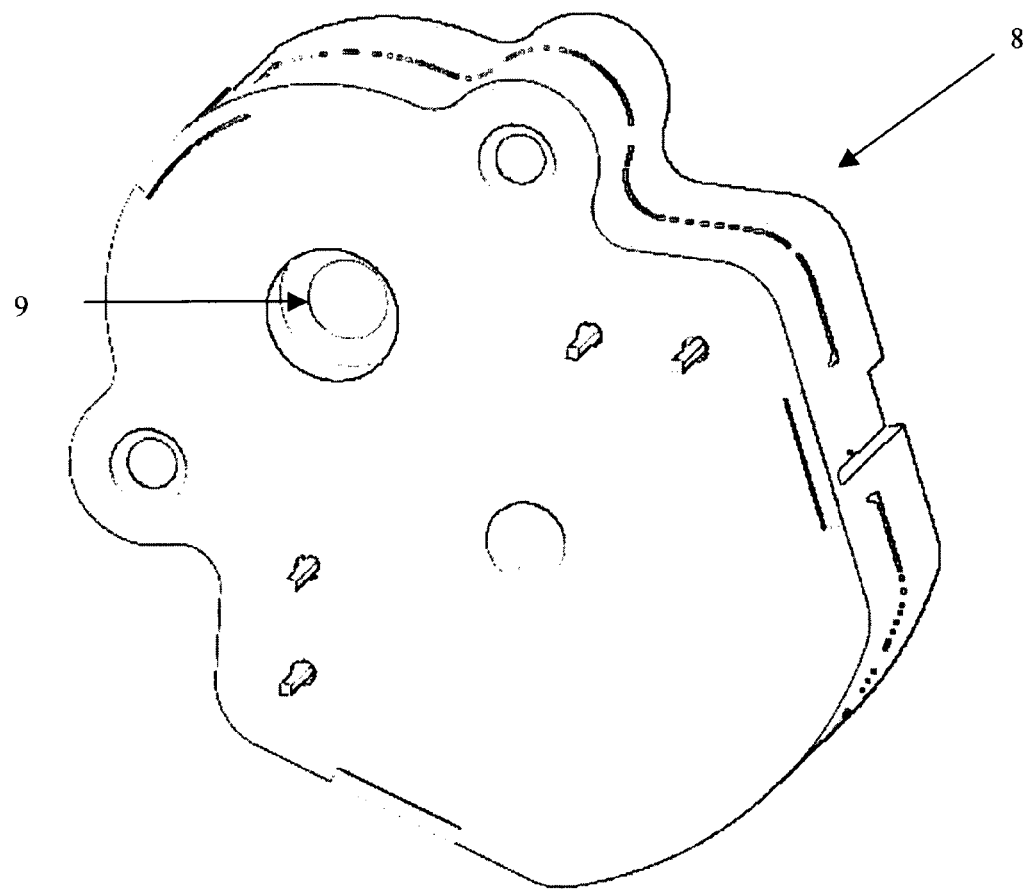
FIG. 5 represents a three-quarters view of the rear face of the motorized box of the invention.

FIGS. 4 and 5 show motorized box (8) of the invention in views from above and below respectively. It is provided with a through hole (9), in which there is a female-type connecting means, suitable for receiving a male-type connecting member on either side of the motor. The rotational movement produced by motor (8) is therefore transmitted to the member to be driven via a connection of male-female type in hole (9).

Figure 6:
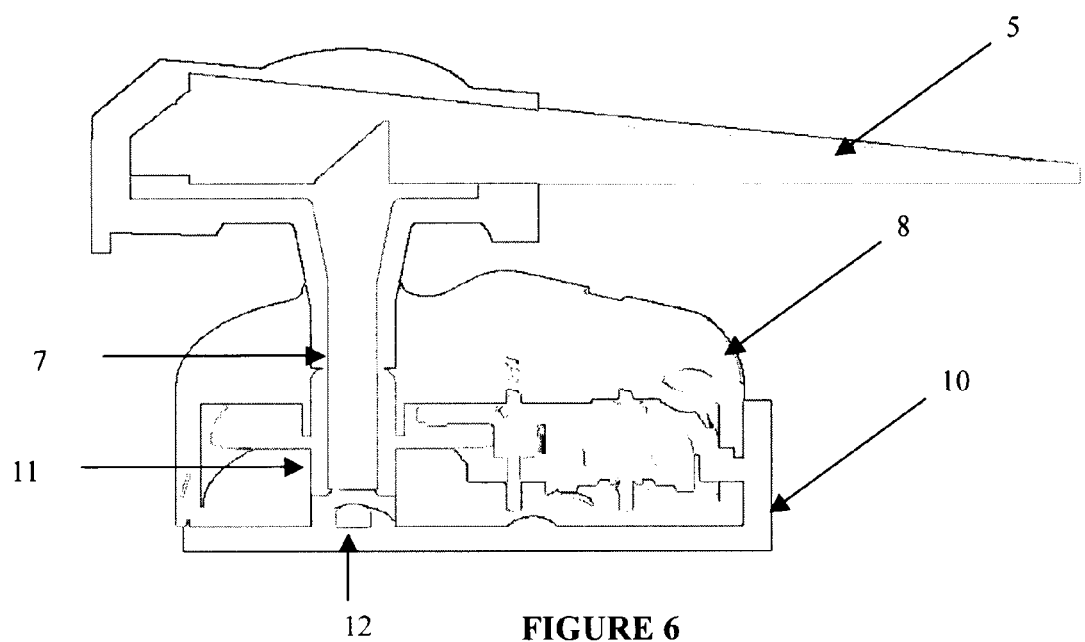
FIG. 6 shows the front mounting of the motor.

FIG. 6 shows a view in section of a first embodiment of the invention.

Motorized box (8) is placed on the upper face of a printed circuit (10), on which all the electronic components (not shown) are mounted. An illuminated dashboard indicator (5) is shown with its male connecting means (7), which on the upper part of motorized box (8) becomes integrated with female connecting means (11) of the said box (8). An illuminating means (12) such as a light-emitting diode is placed on the upper face of printed circuit (10). It is disposed in the axis of rotation of the system and makes it possible to illuminate spindle (7) of luminous indicator (5) directly through motor (8). This configuration is known as front mounting.

Figure 7:
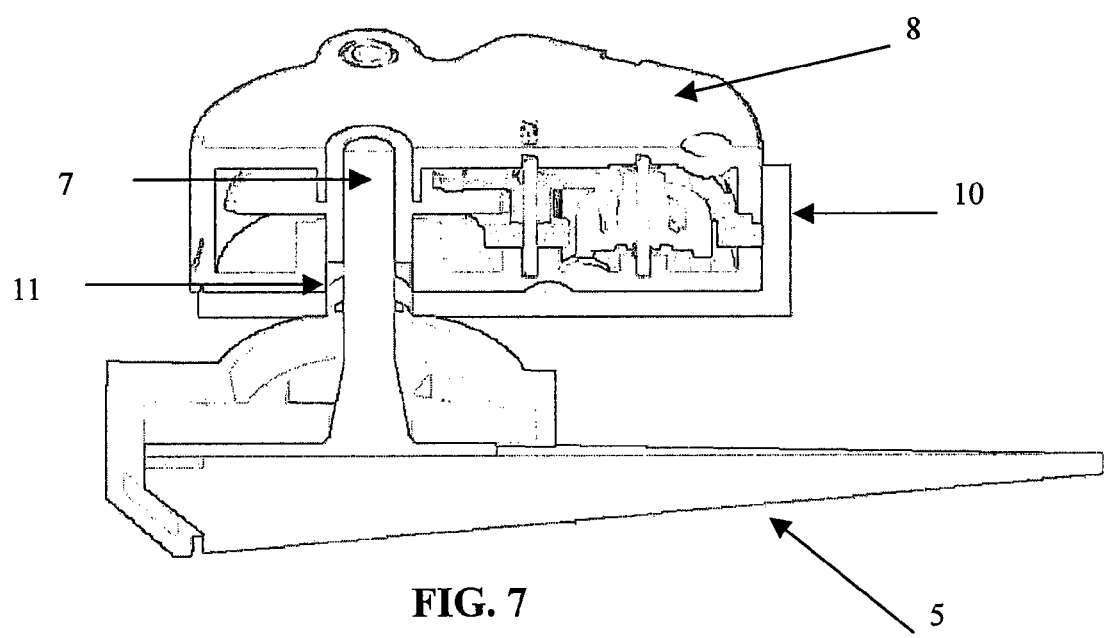
FIG. 7 shows the rear mounting of the motor.

FIG. 7 shows a view in section of a second embodiment of the invention. The same motorized box (8) is placed on the lower face of printed circuit (10), on the unoccupied side. An illuminated dashboard indicator (5) is shown with its male connecting means (7), which on the lower part of motorized box (8) and through printed circuit (10) becomes integrated with female connecting means (11) of the said box (8). An illuminating means (12) such as one or more light-emitting diodes is placed on the lower face of printed circuit (10). Offset from the axis of rotation of the system, it directly illuminates the underside of illuminated indicator (5). This configuration is known as rear mounting.

Figure 8:
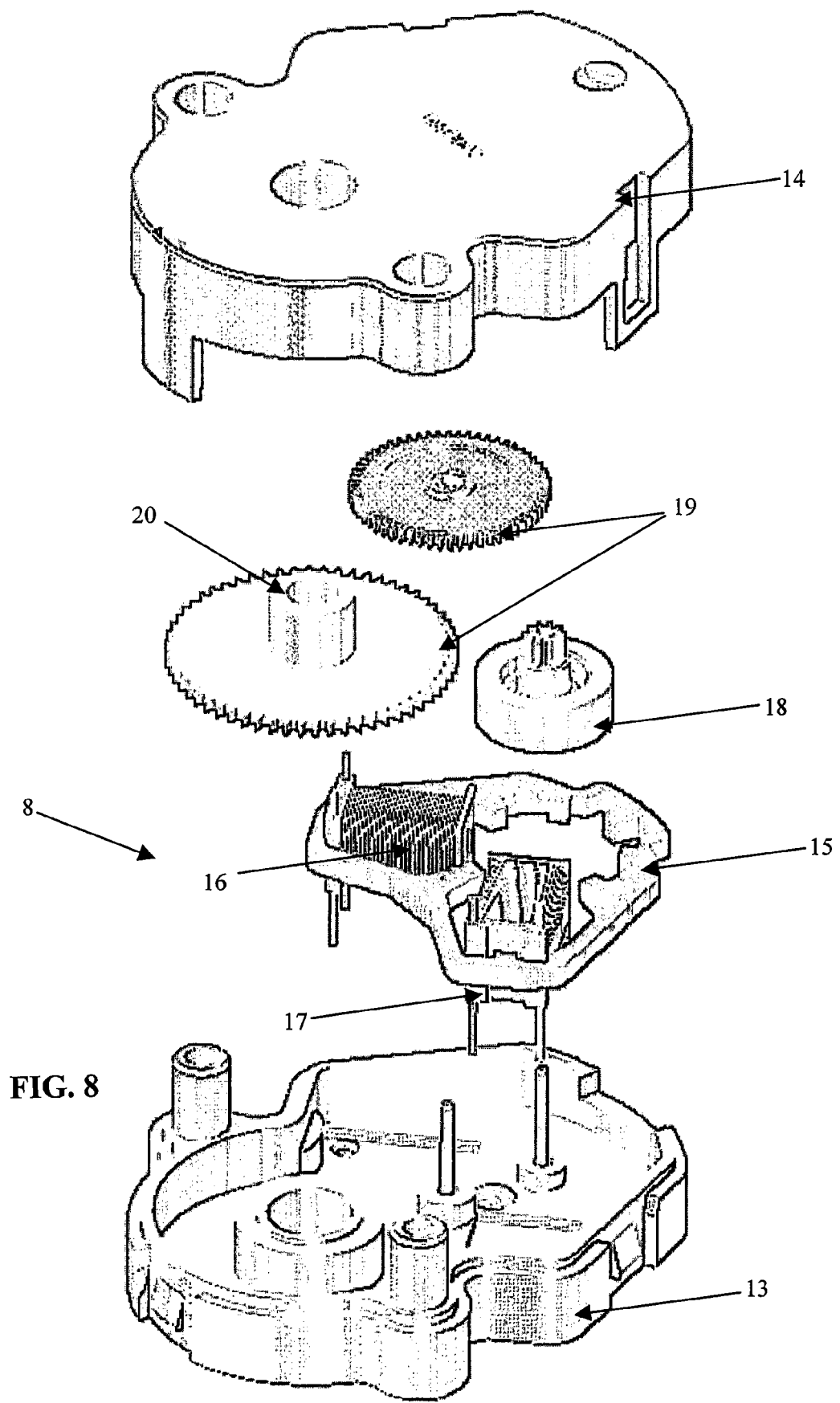
FIG. 8 shows an exploded view of the motor intended to be integrated with the box described by the invention.

FIG. 8 describes a detail of motorized box (8) of the invention. It is composed of a base (13) and a cover (14). In the interior there are placed a magnetic stator assembly (15) comprising at least two electric windings (16, 17), a magnetized rotor (18), a reduction-gear assembly (19) and a female-type connecting means (20). This connecting means (20) inside the motor box is accessible to a male-type connecting means from the upper or lower face of the box through base (13) or cover (14). The motor of two-phase type integrated in motorized box (8) described in FIG. 8 is one possible example of motorization but is in no way limitative.

The invention claimed is:

1. An electrical dashboard actuator comprising:
an electric motor driving an indicator,
wherein the electric motor includes a hollow output shaft, and the indicator includes a male coupling member having a cross section complementary to the internal cross section of the hollow output shaft of the motor,
wherein one of the faces of the motor including a male-type or female-type connector perpendicular to the one face, and
wherein the hollow output shaft is open on two opposite faces of the motor without forming a protuberance relative to the opposite faces, so as to be accessible to the male coupling member from the two opposite faces of the motor.

2. An electrical dashboard actuator according to claim 1, further comprising a box, in an interior of which the electric motor is housed, the box including on two opposite faces an opening coaxial with the output shaft of the motor and openings for passage of the connector.

3. An electrical dashboard actuator according to claim 1, wherein the two opposite faces are substantially planar.

4. An electrical dashboard actuator according to claim 1, wherein the male coupling member of the indicator is configured to guide light to the pointer.

5. An electrical dashboard actuator according to claim 1, wherein the hollow output shaft is made of a transparent material.

6. An electrical dashboard actuator according to claim 1, wherein the male coupling member of the indicator is made of a transparent material and can be connected to either open end of the shaft.

7. A dashboard module comprising:
at least one actuator; and
a printed circuit,
wherein the actuator includes an electric motor driving an indicator by a hollow output shaft, the indicator including a male coupling member having a cross section complementary to the internal cross section of the hollow output shaft of the motor, one of the faces of the motor including a male-type or female-type connector perpendicular to the one face, and
wherein the hollow output shaft is open on two opposite faces of the motor without forming a protuberance relative to the opposite faces, so as to be accessible to the male coupling member from the two opposite faces of the motor.

8. A dashboard module according to claim 7, wherein the at least one actuator is soldered to the printed circuit by the connector.

9. A dashboard module according to claim 7, wherein the printed circuit includes an opening for each actuator for passage of the coupling member of the indicator.

* * * * *